United States Patent
Iwayama et al.

(10) Patent No.: US 7,596,132 B2
(45) Date of Patent: Sep. 29, 2009

(54) COMMUNICATION METHOD, COMMUNICATION SYSTEM, RELAYING DEVICE AND COMMUNICATION DEVICE

(75) Inventors: Noboru Iwayama, Kawasaki (JP); Kinya Yamazaki, Kawasaki (JP); Masahiro Matsuda, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 727 days.

(21) Appl. No.: 11/394,097

(22) Filed: Mar. 31, 2006

(65) Prior Publication Data
US 2007/0147365 A1 Jun. 28, 2007

(30) Foreign Application Priority Data
Dec. 28, 2005 (JP) ............... 2005-379820

(51) Int. Cl.
*H04L 12/56* (2006.01)
(52) U.S. Cl. .................... 370/356; 370/310; 370/389
(58) Field of Classification Search ........... None
See application file for complete search history.

(56) References Cited

U.S. PATENT DOCUMENTS

| 7,079,857 | B2* | 7/2006 | Maggenti et al. | 370/447 |
| 2002/0086665 | A1* | 7/2002 | Maggenti et al. | 455/416 |
| 2002/0151321 | A1* | 10/2002 | Winchell et al. | 455/519 |
| 2003/0008657 | A1* | 1/2003 | Rosen et al. | 455/452 |
| 2003/0046407 | A1* | 3/2003 | Erickson et al. | 709/229 |
| 2004/0057405 | A1 | 3/2004 | Black | |
| 2004/0174830 | A1 | 9/2004 | Koskelainen et al. | |
| 2006/0039389 | A1* | 2/2006 | Burger et al. | 370/401 |
| 2006/0077996 | A1* | 4/2006 | Lee | 370/441 |
| 2006/0117109 | A1* | 6/2006 | Maes | 709/230 |

FOREIGN PATENT DOCUMENTS

| JP | 2000-197027 | 7/2000 |
| JP | 2003-526276 | 9/2003 |
| WO | 01/67675 | 9/2001 |
| WO | 2005/062569 A1 | 7/2005 |

OTHER PUBLICATIONS

European Search Report issued in corresponding European Patent Application 06251767.7-2416 on Apr. 17, 2007.

* cited by examiner

*Primary Examiner*—Min Jung
(74) *Attorney, Agent, or Firm*—Staas & Halsey LLP

(57) ABSTRACT

A communication device transmits to a relaying device a transmission right grant request for requesting a grant of a transmission right to a transmitting device, and the relaying device determines whether the received transmission right grant request is a command associated with the transmission right of the communication device or a command associated with the transmitting device, and if it determines that it is the command associated with the transmitting device, it grants the transmission right to the transmitting device, and starts broadcasting of data being transmitted from the transmitting device. In addition, when receiving from the communication device an operation command for operating the transmitting device, the relaying device determines a type of the command and transmits it to the transmitting device.

15 Claims, 11 Drawing Sheets

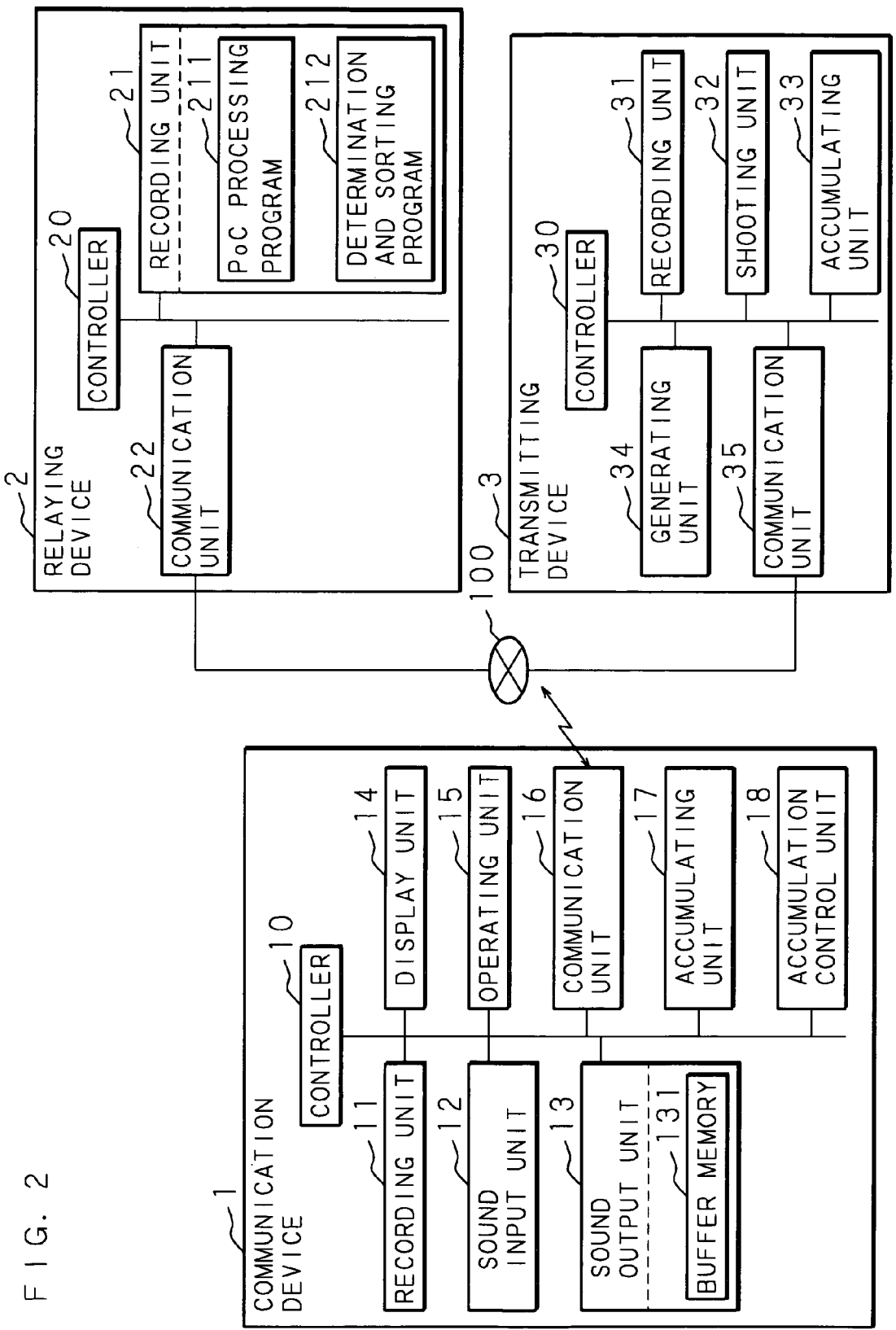

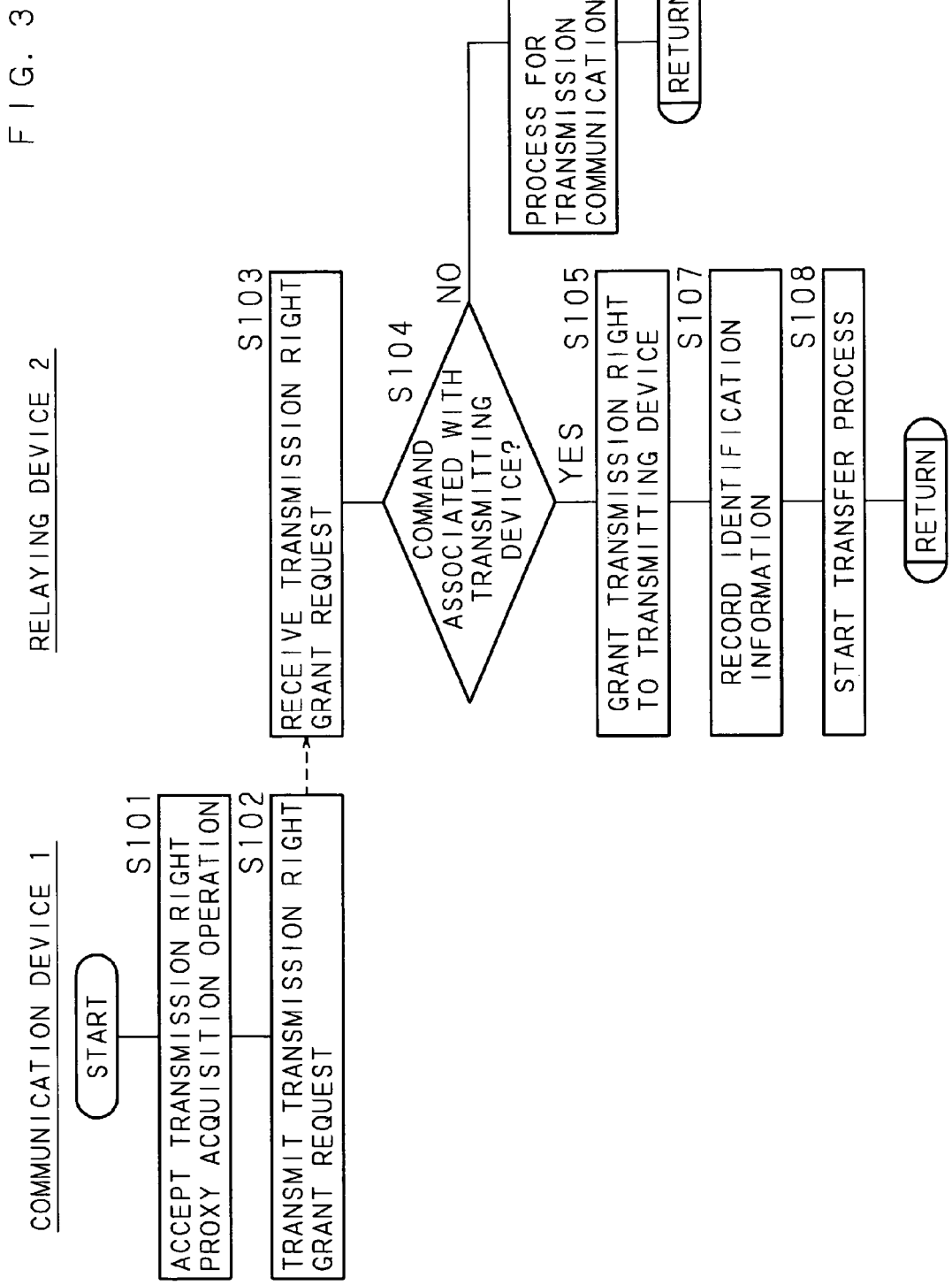

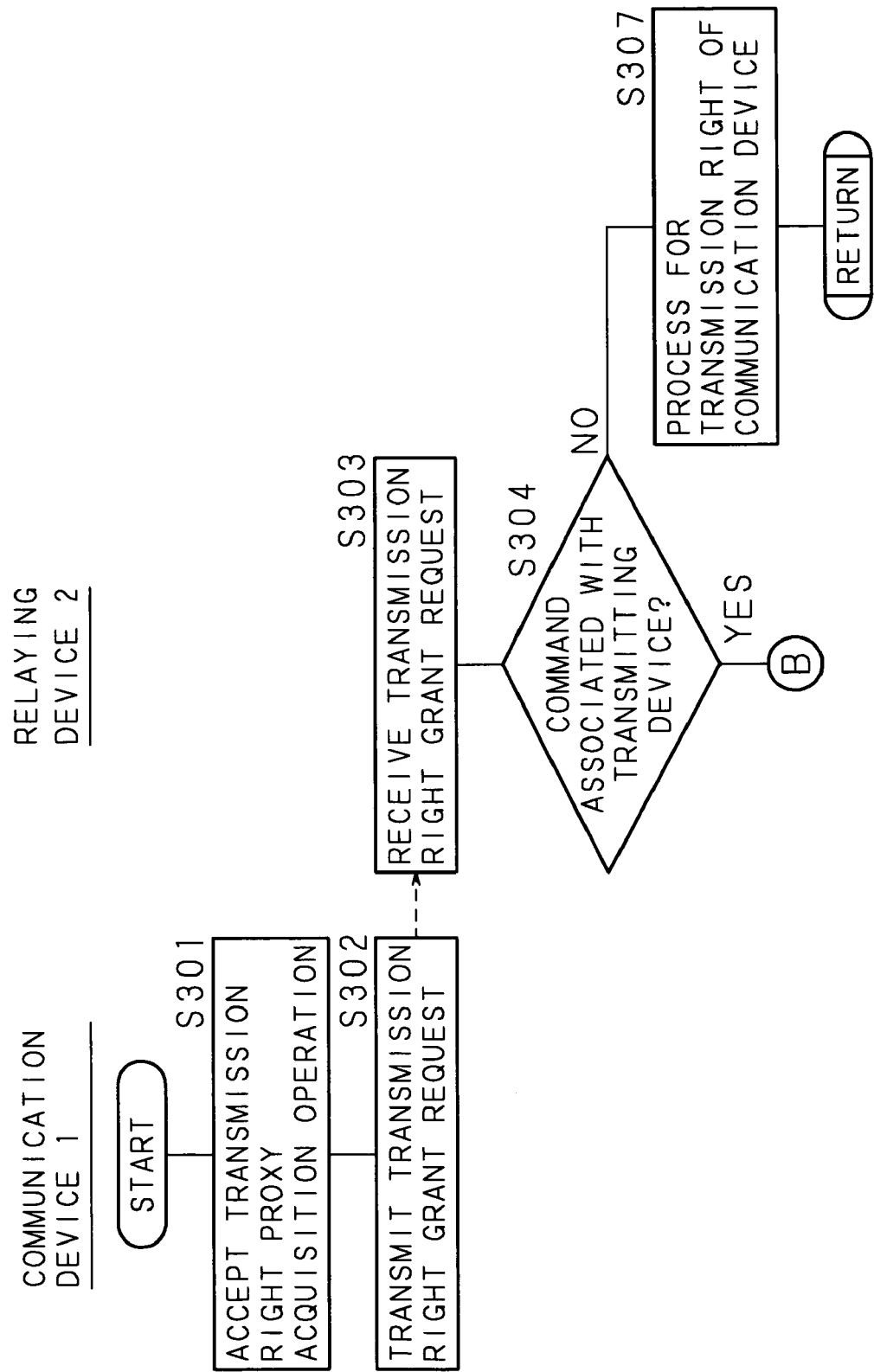

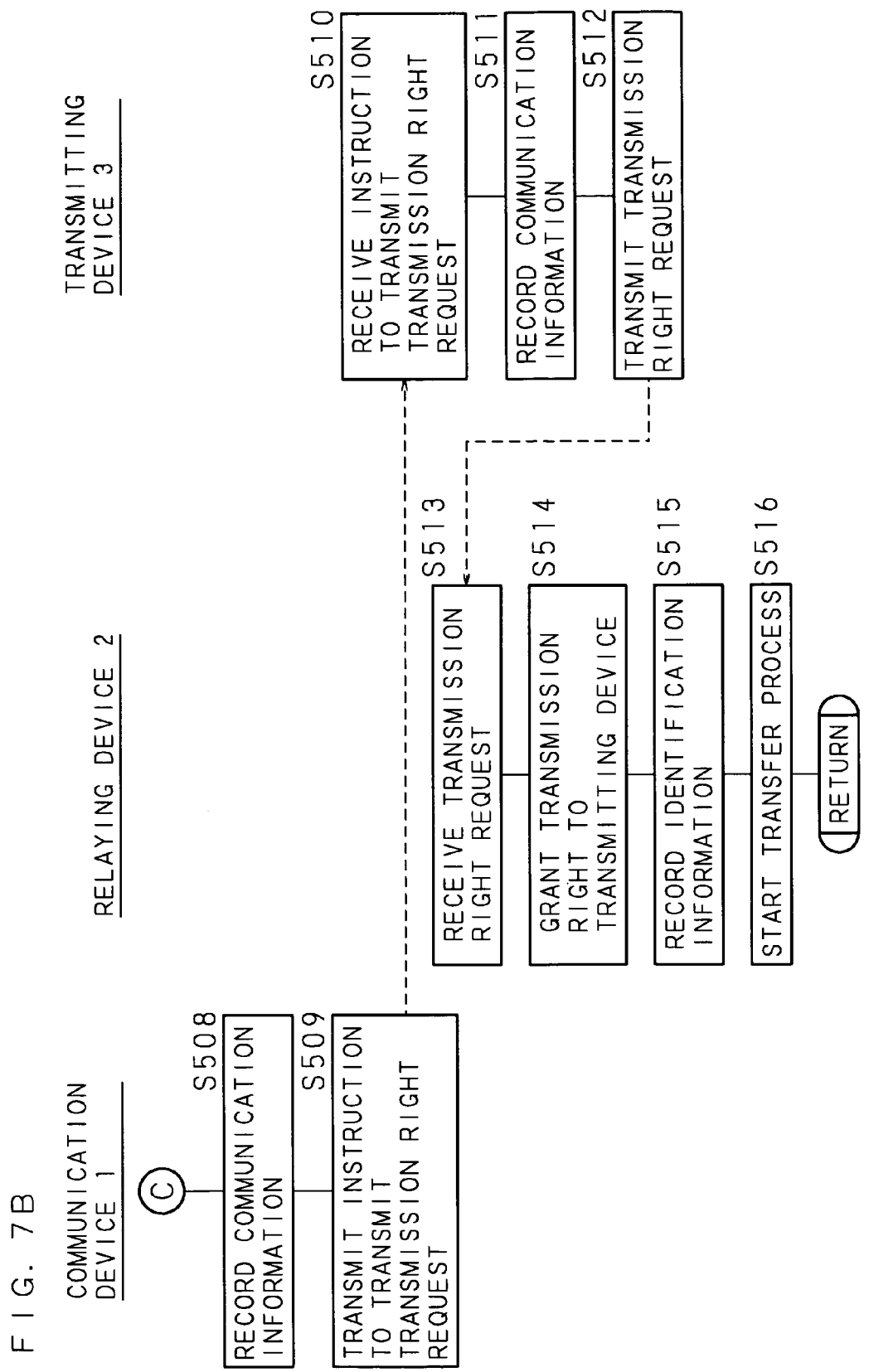

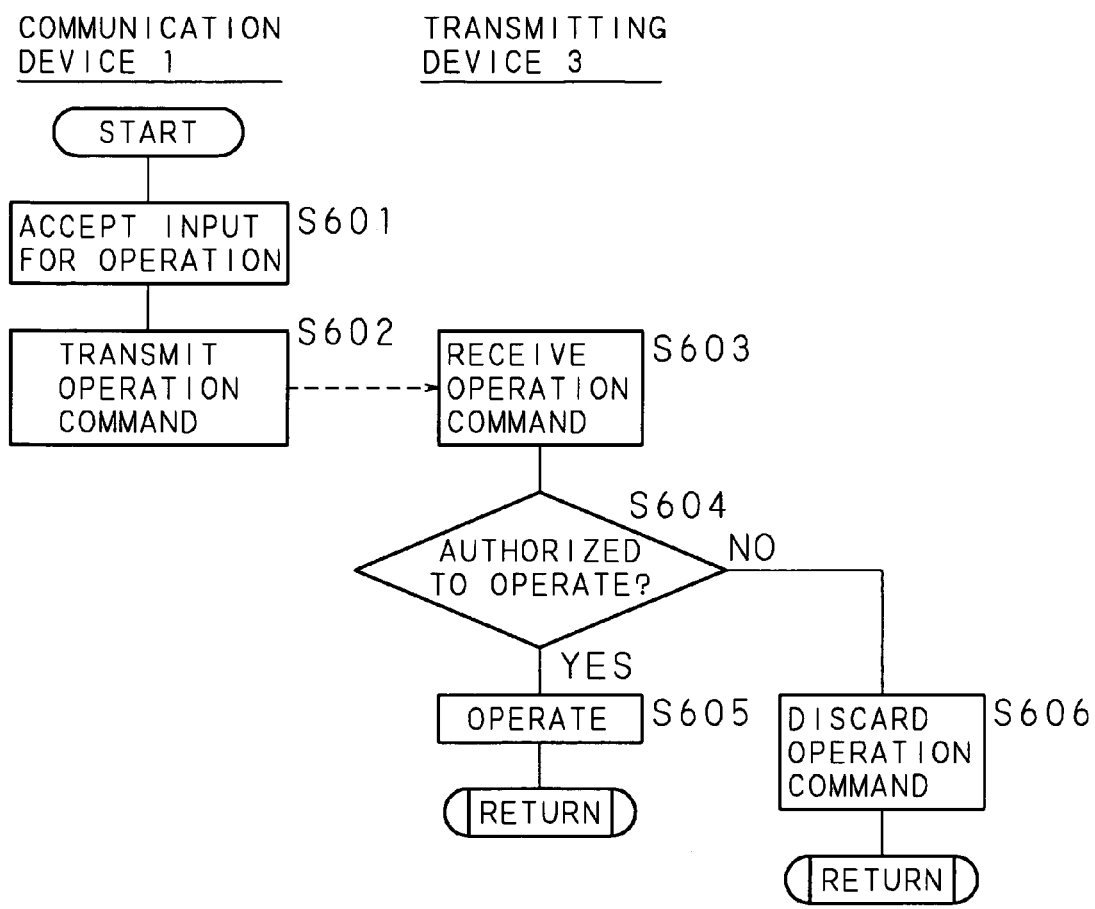

COMMUNICATION METHOD, COMMUNICATION SYSTEM, RELAYING DEVICE AND COMMUNICATION DEVICE

CROSS-REFERENCE TO RELATED APPLICATIONS

This Nonprovisional application claims priority under 35 U.S.C. §119 (a) on Patent Application No. 2005-379820 filed in Japan on Dec. 28, 2005, the entire contents of which are hereby incorporated by reference.

BACKGROUND OF THE INVENTION

1. Field of the Invention

The present invention relates to a communication method in which, using a plurality of communication devices and a relaying device that relays data transmissions between the communication devices, one of the communication devices transmits a transmission right request to the relaying device and transmits data to the relaying device when a transmission right is granted by the relaying device, and the relaying device broadcasts the received data to other communication devices, and further relates to a communication system employing the communication method, as well as to the relaying device provided for the communication system, and the communication device provided for the communication system. In particular, the invention relates to a communication method, a communication system, a relaying device and a communication device that are applicable to a PoC (Push-to-Talk over Cellular) service whereby data is transmitted to a plurality of devices by multiple addressing, by using IP (Internet Protocol) telephone in the same manner as in communication between transceivers.

2. Description of the Related Art

At present, use of real-time application such as VoIP (Voice over Internet Protocol), VoPN (Voice over Packet Network), streaming delivery, etc. has been increasing, wherein voice and image data is transmitted and received among communication devices by way of a communication network such as IP (Internet Protocol) network. Then, an IP telephone, one example thereof, has been spreading rapidly. IP telephony implements a call between a communication device on a transmitting end and that on a receiving end by transmitting/receiving voice data by way of an IP network.

In addition, a service called PoC (Push-to-Talk over Cellular) has now come under the spotlight wherein it transmits packets containing voice data to a plurality of communication devices by multiple addressing, by using technology of the IP telephone as if it were a transceiver. The characteristic of the PoC service is that the PoC employs half duplex communication wherein one of a plurality of communication devices acquires a transmission right to transmit voice data, the one communication device that has acquires the transmission right transmits the voice data to the other plurality of communication devices by multiple addressing, and thus enabling the simultaneous communication among three or more devices.

As described above, in a group communication system such as the PoC service, etc, one device that has acquired a transmission right transmits voice data to a plurality of other devices by using multiple addressing, which can realize a one-to-many communication, thereby saving trouble and reducing cost of transmitting the same content individually. As another advantage, even if a speaker who has acquired the transmission right intends to speak to a single person, it is possible to share the information by broadcasting the content.

Further, Japanese Published Patent Publication No. 2003-526276 also discloses an embodiment in which a digital camera, for example, is used as a communication device in such a service.

BRIEF SUMMARY OF THE INVENTION

However, the technique disclosed in Japanese Published Patent Publication No. 2003-526276 has a problem that a specific method of operating a digital camera is not disclosed. Further, there is another problem that the above-noted application does not disclose an application of, in addition to the digital camera, a device that cannot be physically operated in hands of a user to the group communication system.

The present invention has been made with the aim of solving the above problem, and it is an object of the present invention to provide a communication method in which a communication device requests a transmission right on behalf of a transmitting device such as a camera that cannot be physically operated by hands of a user and operates the transmitting device by remote control, thereby realizing a group communication system such as a PoC service using the transmitting device such as a camera, and further provide a communication system employing the communication method, as well as to the relaying device provided for the communication system, and the communication device provided for the communication system.

A communication method according to a first aspect is a communication method wherein using a plurality of communication devices and a relaying device for relaying data transfer among the communication devices, one communication device transmits to the relaying device a transmission right request for requesting a transmission right, which is one of commands associated with its own transmission right and transmits data to the relaying device when the communication devices is granted the transmission right by the relaying device, and the relaying device broadcasts the received data to other communication device, characterized by comprising the steps of the communication device transmitting to the relaying device a transmission right grant request for requesting a grant of a transmission right to a transmitting device, which is one of the commands associated with the transmitting device that communicates with the relaying device and transmits data to the relaying device; the relaying device determining whether the received transmission right grant request is a command associated with a transmission right of the communication device of a transmission source or a command associated with the transmitting device; if the relaying device determines that it is the command associated with the transmitting device, the relaying device following the command and granting a transmission right to the transmitting device; the relaying device broadcasting to the plurality of communication devices data being transmitted from the transmitting device to which the transmission right is granted; the communication device further transmitting to the relaying device an operation command for operating the transmitting device, which is one of the commands associated with the transmitting device; the relaying device further determining whether the received operation command is the command associated with the transmission right of the communication device of the transmission source, or the command associated with the transmitting device; if the relaying device determines that it is the command associated with the transmitting device, the relaying device transmitting the operation command to the transmitting device; and the transmitting device operating based on the received operation command.

A communication method according to a second aspect is a communication method wherein using a plurality of communication devices and a relaying device for relaying data transfer among the communication devices, one communication device transmits to the relaying device a transmission right request for requesting a transmission right, which is one of commands associated with its own transmission right and transmits data to the relaying device when the communication device is granted the transmission right by the relaying device, and the relaying device broadcasts the received data to other communication device, characterized by comprising the steps of the communication device transmitting to the relaying device a transmission right grant request for granting of the transmission right to a transmitting device, which is one of commands associated to the transmitting device that communicates with the relaying device and the communication devices, and transmits data to the relaying device; the relaying device determining whether the received transmission right grant request is a command associated with the transmission right of the communication device of a transmission source or a command associated with the transmitting device; if the relaying device determines that it is the command associated with the transmitting device, the relaying device following the command and granting the transmission right to the transmitting device; the relaying device broadcasting to the plurality of communication devices data being transmitted from the transmitting device to which the transmission right is granted; the relaying device transmitting to the communication device communication information necessary for communication with the transmitting device; the communication device further transmitting to the transmitting device an operation command for operating the transmitting device, based on the received communication information; and the transmitting device operating based on the received operation command.

A communication method according to a third aspect is a communication method wherein using a plurality of communication devices and a relaying device for relaying data transfer among the communication devices, one communication device transmits to the relaying device a transmission right request for requesting a transmission right, and transmits data to the relaying device when the communication device is granted the transmission right by the relaying device, and the relaying device broadcasts the received data to other communication device, characterized by comprising the steps of: the communication device transmitting to the relaying device a communication information transmission request for requesting transmission of the communication information necessary for communication with a transmitting device that communicates the relaying device and the communication device, and transmits data to the relaying device; the relaying device transmitting the communication information to the communication device, in response to the received communication information transmission request; based on the received communication information, the communication device further transmitting to the transmitting device an instruction to transmit a transmission right request that causes the transmitting device to transmit a transmission right request for requesting the transmission right to the transmitting device; based on the received instruction to transmit the transmission right request, the transmitting device transmitting to the relaying device the transmission right request for requesting the transmission right to itself, based on the received transmission right request, the relaying device further granting the transmission right to the transmitting device; the relay broadcasting to the plurality of communication devices data being transmitted from the transmitting device to which the transmission right is granted; based on the communication information, the communication device further transmitting to the transmitting device an operation command for operating the transmitting device; and the transmitting device further operating based on the received operation command.

A communication system according to a fourth aspect is a communication system comprising a plurality of communication devices and a relaying device for relaying data transfer among the communication devices, wherein one communication device transmits to the relaying device a transmission right request for requesting a transmission right, which is one of commands associated with its own transmission right and transmits data to the relaying device when the communication device is granted the transmission right by the relaying device, and the relaying device broadcasts the received data to other communication device, characterized by comprising: a transmitting device that communicates with the relaying device and transmits data to the relaying device, wherein the communication device comprises: means for transmitting to the relaying device a transmission right grant request for requesting the grant of the transmission right to the transmitting device, which is one of the commands associated with the transmitting device, the relaying device comprises, means for determining whether the received transmission right grant request is a command associated with the transmission right of the communication device of a transmission source or a command associated with the transmitting device, if it is determined that it is the command associated with the transmitting device, means for following the command and granting the transmission right to the transmitting device; and means for broadcasting to a plurality of communication devices data being transmitted from the transmitting device to which the transmission right is granted, the communication device further comprises: means for transmitting to the relaying device an operation command for operating the transmitting device, which is one of the commands associated with the transmitting device, the relaying device further comprises: means for determining whether the received operation command is the command associated with the transmission right of the communication device of the transmission source or the command associated with the transmitting device, and if it is determined that it is the command associated with the transmitting device, means for transmitting the operation command to the transmitting device, the transmitting device comprises: means for operating based on the received operation command.

A communication system according to a fifth aspect is a communication system comprising a plurality of communication devices and a relaying device for relaying data transfer among the communication devices, wherein one communication device transmits to the relaying device a transmission right request for requesting a transmission right, which is one of commands associated with its own transmission right and transmits data to the relaying device when the communication device is granted the transmission right by the relaying device, and the relaying device broadcasts the received data to other communication device, characterized by comprising: a transmitting device that communicates with the relaying device and the communication devices and transmits data to the relaying device, wherein the communication device comprises: means for transmitting to the relaying device a transmission right grant request for requesting the grant of the transmission right to the transmitting device, which is one of the commands associated with the transmitting device; the relaying device comprises: means for determining whether the received transmission right grant request is a command associated with a transmission right of a communication device of a transmission source or a command associated with the transmitting device; if it is determined that it is the command associated with the transmitting device, means for following the command and granting the transmission right to the transmitting device; means for transmitting to the communication device communication information necessary for communication with the transmitting device; and means for broadcasting to the plurality of communication devices data being transmitted from the transmitting device to which the transmission right is granted; the communication device further comprises: based on the received communication information, means for transmitting to the transmitting device an operation command for operating the transmitting device; the transmitting device comprises: means for operating based on the received operation command.

A communication system according to a sixth aspect is a communication system comprising a plurality of communication devices and a relaying device for relaying data transfer among the communication devices, one communication device transmits to the relaying device a transmission right request for requesting a transmission right, and transmits data to the relaying device when the communication device is granted the transmission right by the relaying device, and the relaying device broadcasts the received data to other communication device, characterized by comprising: a transmitting device that communicates with the relaying device and communication devices and transmits data to the relaying device, wherein the communication device comprises: means for transmitting to the relaying device a communication information transmission request for requesting transmission of communication information necessary for communication with the transmitting device; the relaying device comprises: means for transmitting the communication information to the communication device in response to the received communication information transmission request; the communication device further comprises: based on the received communication information, means for transmitting to the transmitting means an instruction to transmit a transmission right request that causes the transmitting device to transmit a transmission right request for requesting the transmission right to the transmitting device; the transmitting device comprises: based on the received instruction to transmit the transmission right request, means for transmitting to the relaying device the transmission right request for requesting the transmission right to itself, the relaying device further comprises: based on the received transmission right request, means for granting the transmission right to the transmitting device; and means for broadcasting to the plurality of communication devices data being transmitted from the transmitting device to which the transmission right is granted; the communication device further comprises: based on the communication information, means for transmitting to the transmitting device an operation command for operating the transmitting device; the transmitting device further comprises: means for operating based on the received operation command.

A communication system according to a seventh aspect is the communication system according to any one of the fourth aspect to the sixth aspect, characterized in that the transmitting device further comprises: shooting means, and is configured to transmit, as data, images based on the shooting of the shooting means.

A relaying device according to an eighth aspect is a relaying device communicating with a plurality of communication devices, granting a transmission right to one communication device of a transmission source of a transmission right request when the replaying device receives the transmission right request for requesting a transmission right, which is one of commands associated with the transmission right of the communication device from the one communication device, and broadcasting to other communication device data received from the one communication device to which the transmission right is granted, characterized by comprising: means for communicating with a transmitting device that transmits data; means for receiving from the communication device a transmission right grant request for requesting the grant of the transmission right to the transmitting device, one of the commands associated with the transmitting device; means for determining whether the received command is a command associated with the transmission right of the communication device of the transmission source or a command associated with the transmitting device; if it is determined that it is the command associated with the transmitting device, means for following the command and granting the transmitting right to the transmitting device; means for broadcasting to the plurality of communication devices data being transmitted from the transmitting device to which the transmission right is granted; means for receiving from the communication device an operation command for operating the transmitting device, which is one of the commands associated with the transmitting device; means for determining whether the received command is the command associated with the transmission right of the communication device of the transmission source, or the command associated with the transmitting device; and if it is determined that it is the command associated with the transmitting device, means for transmitting the operation command to the transmitting device.

A relaying device according to a ninth aspect is a relaying device communicating with a plurality of communication devices, granting a transmission right to a communication device of a transmission source of a transmission right request when the relaying device receives the transmission right request for requesting the transmission right, which is one of commands associated with the transmission right of the communication device from the one communication device, and broadcasting to other communication device data received from the one communication device to which the transmission right is granted, characterized by comprising: means for communicating with a transmitting device that transmits data; means for receiving from the communication device a transmission right grant request for requesting the grant of the transmission right to the transmitting device, one of the commands associated with the transmitting device; means for determining whether the received command is a command associated with the transmission right of the communication device of the transmission source or a command associated with the transmitting device; if it is determined that it is the command associated with the transmitting device, means for following the command and granting the transmitting right to the transmitting device; means for broadcasting to the plurality of communication devices data being transmitted from the transmitting device to which the transmission right is granted; and means for transmitting to the communication device the communication information necessary for communication with the transmitting device.

A communication device according to a tenth aspect is a communication device communicating with a relaying device which communicates with a plurality of devices, grants a transmission right to one device of a transmission source of a transmission right request when the relaying device receives the transmission right request for requesting the transmission right from the one device, and broadcasts data received from the one device to which the transmission right is granted, characterized by comprising: means for transmitting to the relaying device a transmission right grant request for requesting the grant of the transmission right to a transmitting device that communicates with the relaying device and transmits data to the relaying device; and means for transmitting to the relaying device an operation command for operating the transmitting device.

In the present invention, a communication device can acquire a transmission right or carry out operation on behalf of a transmitting device, since the relaying device determines a type of a command received from the communication device, therefore it is possible to remotely control a transmitting device such as a camera that cannot be physically operated by hands of the user, and to realize data sharing of such as image data, etc. to be sent from the transmitting device.

A communication method, a communication system, a relaying device and a communication device according to the present invention are applied to such as a group communication system called the PoC service that is configured by a plurality of communication devices; a relaying device that relays data transmissions among the communication devices; and a transmitting device such as a camera that transmits data such as shot image data. In such a group communication system, one communication device transmits a transmission right request to the relaying device, and when the transmission right is granted by the relaying device, the communication device that is granted the transmission right transmits such data as voice data to the relaying device, which in turn broadcasts the received data to the other communication devices. As a proxy of a transmitting device, the communication device transmits to the relaying device a transmission right grant request that requests a transmission right to be granted to the transmitting device, and the relaying device determines whether the received transmission right grant request is a command associated with a transmission right of the communication device or a command associated with the transmitting device, and if determined to be the command associated with the transmitting device, the relaying device grants the transmission right to the transmitting device and broadcasts data sent from the transmitting device to the communication devices. In addition, when receiving an operation command to operate the transmitting device from the communication device, the relaying device determines a command type and then transmits the operation command to the transmitting device.

With this configuration, the present invention has beneficial effect that through remote control of the transmitting device such as a camera that a user physically cannot operate by hands, sharing of data, such as image data, transmitted from the transmitting device, can be implemented, since the communication device can acquire a transmission right and carry out an operation on behalf of the transmitting device.

The present invention has another beneficial effect that since communication information necessary for communicating with the transmitting device that acquired the transmission right, such as a communication address indicating a location on a communication network that mediates communications of respective devices is transmitted from the relaying device to the communication device, a user who operates the communication device has access to the transmitting device based on the communication information, and can operate the transmitting device without the relaying device.

The present invention has further beneficial effect that since the communication information is transmitted from the relaying device to the communication device, the user who operates the communication device has access to the transmitting device based on the communication information, and can have it execute such operations as acquisition of a transmission right, operation, without involving the relaying device.

The above and further objects and features of the invention will more fully be apparent from the following detailed description with accompanying drawings.

BRIEF DESCRIPTION OF THE SEVERAL VIEWS OF THE DRAWINGS

FIG. 2 is a block diagram showing configuration examples of various devices provided for the communication system in the first embodiment of the present invention;

FIG. 3 is a flow chart illustrating a transmission right proxy acquisition process of a communication device and a relaying device in the first embodiment of the present invention;

FIGS. 5A and 5B are flow charts illustrating a transmission right proxy acquisition process of a communication device and a relaying device in a second embodiment of the present invention;

FIGS. 7A and 7B are flow charts illustrating a transmission right acquisition process of a communication device, a relaying device, and a transmitting device in a third embodiment of the present invention; and FIG. 8 is a flow chart illustrating a remote control process of the communication device and the transmitting device in the third embodiment of the present invention.

DETAILED DESCRIPTION OF THE INVENTION

The following describes the present invention in detail with reference to the drawings illustrating embodiments thereof.

First Embodiment

Figure 1:
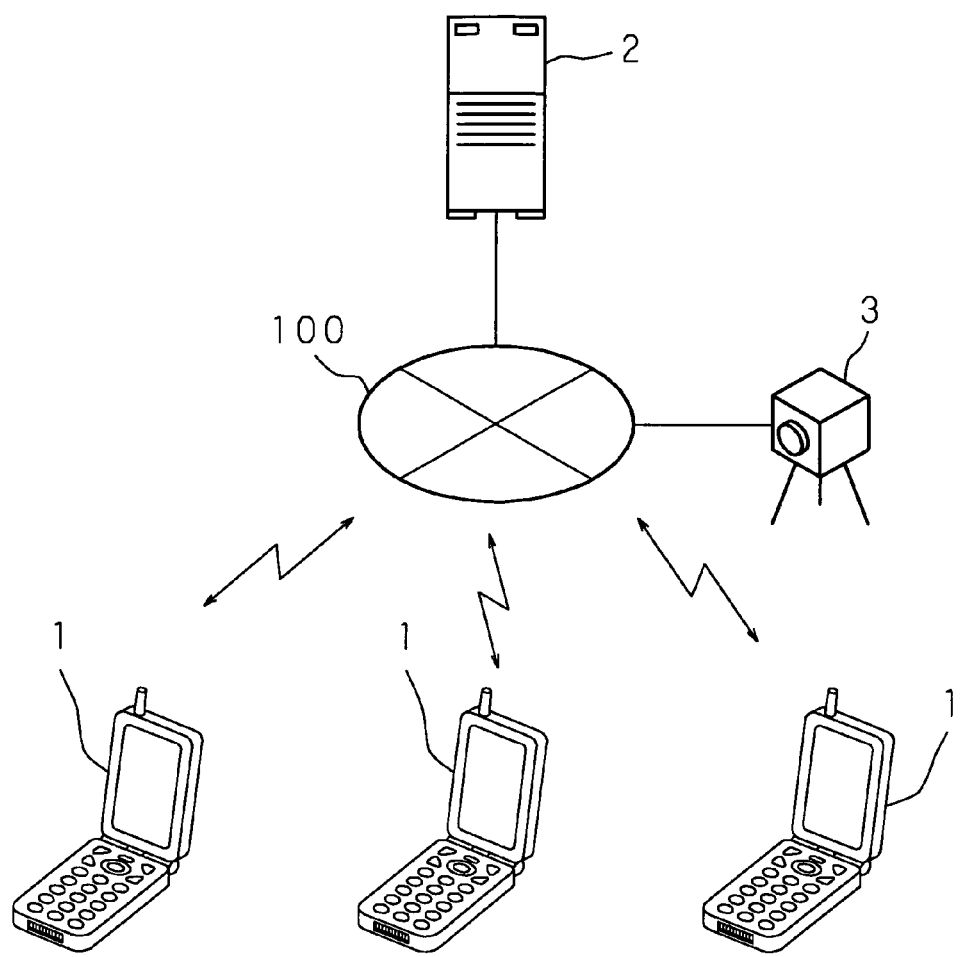
FIG. 1 is a conceptual diagram showing a configuration example of a communication system in a first embodiment of the present invention.

FIG. 1 is a conceptual diagram showing a configuration example of a communication system in a first embodiment of the present invention. The numeral 1, 1, . . . in FIG. 1 designates communication devices such as portable IP (Internet Protocol) telephones provided with a transceiver function and used in a group communication system such as PoC (Push-to-Talk over Cellular) service. A communication device 1 is connected to a communication network 100 such as VoIP (Voice over Internet Protocol) network, relayed to a relaying device 2 such as a PoC server computer, and conducts packet communication with other communication devices 1, 1, . . .

Communication by the PoC service is half duplex communications conducted by plurality of grouped communication devices 1, 1, . . . under the control of a relaying device 2, wherein the communication device 1 that acquired a transmission right transmits to other communication devices 1, 1, . . . through the relaying device 2 packets that are generated based on voice data for outputting inputted voice by multiple addressing. Then, upon receipt of the packets containing the voice data, the communication device 1 outputs voice based on the voice data contained in the received packets. A transmission right is not retained by one communication device 1 but is transferred to other communication device 1 that makes a transmission right request. The packets containing the voice data is based on such a protocol used in VoIP communications as RTP (Real-time Transport Protocol), etc.

In addition, to the relaying device 2 is connected a transmitting device 3 such as a digital video camera, etc., by way of a communication network 100, wherein the transmitting device 3 generates image data based on shooting and transmits the generated image data, as packets, by streaming to the relaying device 2.

FIG. 2 is a block diagram showing configuration examples of various devices provided for the communication system of the first embodiment of the present invention. The communication device 1 includes various circuits such as control means 10 (controller) for controlling the entire device, recording means 11 (recording unit) formed by volatile or nonvolatile memory that records various information such as a program and data, sound input means 12 (sound input unit) such as a microphone, that receives sound input, sound output means 13 (sound output unit) such as a speaker that outputs sound, display means 14 (display unit) such as a liquid crystal monitor, etc., operating means 15 (operating unit) such as various pushbuttons, communication means 16 (communication unit) connected to the communication network 100, accumulating means 17 (accumulating unit) to be used as a communication buffer, and accumulation control means 18 (accumulation control unit) that controls accumulation of the accumulating means 17.

Then, in the communication device 1, the following operations are carried out under the control of the control means 10. The communication device 1 converts into digital data, sound it accepted as analog data from the sound input means 12, divides the sound data being the digital data into predetermined data length, and transmits it as packets from the communication means 16. In addition, when the communication device 1 receives packets containing sound data from the communication means 16, it accumulates the sound data contained in the received packets in the accumulating means 17, and outputs the accumulated sound data to the sound output means 13. The sound output means 13 is constituted from sound chips, and includes a buffer memory 131, accumulates the accepted sound data in the buffer memory 131, converts the accumulated sound data into analog data, and outputs, as sound, the sound data converted into the analog data at predetermined time intervals set as output intervals. Furthermore, receiving packets containing image data from the communication means 16, the communication device 1 accumulates the image data contained in the received packets in the accumulating means 17, and displays images based on the accumulated image data on the display means 14. As the operating means 15 that the communication device 1 includes, there are various pushbuttons, such as, numeric keys, symbol keys, various function keys, etc., for example, and as one of the function keys, there is provided PoC dedicated key for requesting a transmission right.

The relaying device 2 includes control means 20 (controller), recording means 21 (recording unit), and communication means 22 (communication unit) connected to the communication network 100. The relaying device 2 manages grouped devices that make a call based on the PoC service and any device that acquired a transmission right in the group, execute the operation of allowing one device to acquire a transmission right in response to a transmission right request therefrom, and execute the operation of allowing the one device to release the transmission right in response to the transmission right release request therefrom. Furthermore, the relaying device 2 records in the recording means 21 communication information such as communication address (IP address), indicating a position of the transmitting device on the communication network 100 of the transmitting device 3, for conducting communication with various devices such as the communication device 1 and the transmitting device 3. In the relaying device 2 are recorded computer programs for the relaying device of the present invention, such as PoC processing program 211 that implements functions as a PoC server computer that executes such operations as acquisition and release of a transmission right, broadcasting, etc., and a determination and sorting program 212 that determines a type of a received command and sorts a command associated with PoC and a command associated with proxy operation of the transmitting device 3, etc. Then, by executing the computer program for the relaying device of the present invention that is recorded in the recording means 21, the relaying device 2 implements the functions as the PoC server computer and the determination/sorting function, and operates as the relaying device 2 of the present invention.

The transmitting device 3 includes control means 30 (controller), recording means 31 (recording unit), shooting means 32 (shooting unit) using an imaging device such as CCD (Charge Coupled Device), etc., accumulating means 33 (accumulating unit) for accumulating digital data based on shooting by the shooting means 32, generating means 34 (generating unit) that compresses the digital data accumulated in the accumulating means 33 in such a format as MPEG (Moving Picture Experts Group), etc., and generates image data being streaming data, and communication means 35 (communication unit) that is connected to the communication network 100, and carries out transmission of the image data generated by the generating means 34 and reception of data or operation command to be sent out from the relaying device 2 or the communication device 1.

The following describes processes of the various devices in the first embodiment of the present invention. FIG. 3 is a flow chart illustrating a transmission right proxy acquisition process of the communication device 1 and the relaying device 2 in the first embodiment of the present invention. The communication device 1 and the relaying device 2 execute the following process by control of the respective control means 10 and 20.

When a user who operates the communication device 1 desires streaming delivery of shot images by the transmitting device 3, as a proxy of the transmitting device 3, a predetermined operation of having the transmitting device 3 acquire a transmission right is performed. The communication device 1 accepts the transmission right proxy acquisition operation from the operating means 15 (S101) and, based on the accepted operation, a transmission right grant request that is a command to request a grant of the transmission right is transmitted from the communication means 16 to the relaying device 2 by way of the communication network 100 (S102). The transmission right grant request is one command contained in a group of commands associated with the transmitting device 3.

The relaying device 2 receives the transmission right grant request at the communication means 22 (S103), recognizes that the received transmission right grant request is a command, and determines whether it is a command associated with a transmission right of the communication device 1 of a transmission source or a command associated with the transmitting device 3 (S104). A packet containing the transmission right grant request contains, as header information, various types of information such as a packet version, identification information of the device of the transmission source such as a communication address, identification information of a device of a receiving end such as a communication address, packet length, a type of command such as PoC, etc., additional information such as options, etc., data length of the additional information, etc., and includes content of the command as data. The additional information includes information such as a pre-assigned name, etc. for identifying the transmitting device 3, based on which information the relaying device 2 makes a determination in step S104. In addition, if the communication device 1 recognizes the identification information such as a communication address of the transmitting device (IP address), etc., as information for specifying the transmitting device 3, the identification information may be used as information specifying the transmitting device 3.

If it is determined in step S104 that it is the command associated with the transmitting device 3 (S104: YES), the relaying device 2 follows the received command and grants a transmission right to the transmitting device 3 (S105). Although granting of a transmission right in step S105 requires that any of the grouped devices is not granted a transmission right or that release of the transmission right granted to other device is possible, these requirements are similar to those associated with granting of a transmission right in the conventional the PoC service. In addition, if a transmission right is granted to the transmitting device 3, notification information is sent to other grouped devices, informing them that the transmitting device 3 was granted a transmission right.

If it is determined in step S104 that it is not the command associated with the transmitting device 3, in other words, that it is a command such as a transmission right acquisition request, a transmission right release request, etc., of the communication device 1 of the transmission source (S104: NO), the relaying device 2 follows the command and executes a process for granting/releasing a transmission right to the communication device 1, etc. (S106). In the embodiment, because the description is given to the embodiment of receiving the command associated with the transmitting device 3, unless there is any factor such as occurrence of abnormality, setting of other conditions, etc., it is determined in no case in step 104 that it is not the command associated with the transmitting device 3.

The relaying device 2 that granted the transmission right to the transmitting device 3 in step S105 records in the recording means 21 the identification information that identifies the transmitting device 3 to which the transmission right was granted and the communication device 1 that serves as a proxy of the transmitting device 3, respectively (S107), receives image data based on such a protocol as RTP, etc., being transmitted from the transmitting device 3 to which the transmission right was granted, starts a transfer process by which it broadcasts the received image data to a plurality of other grouped devices (S108). In step S107, by recording the identification information, the relaying device manages the identification information of the grouped devices and the device to which the transmission right was granted, as management of grouping of the group communication system. The relaying device 2 of the present invention also manages a communication device 1 that serves as a proxy for acquisition of a transmission right, and, as described below, is given authority to operate a transmitting device 2 to which the transmission right is granted. Although the transmitting device 3 always transmits generated image data to the relaying device 2, it may transmit the image data only when it receives the notification information and recognizes that it acquired the transmission right. The communication device 1 that received the image data transferred in step S105 displays images based on the image data on the display means 14. Thus, the transmission right proxy acquisition process is executed.

Figure 4A:
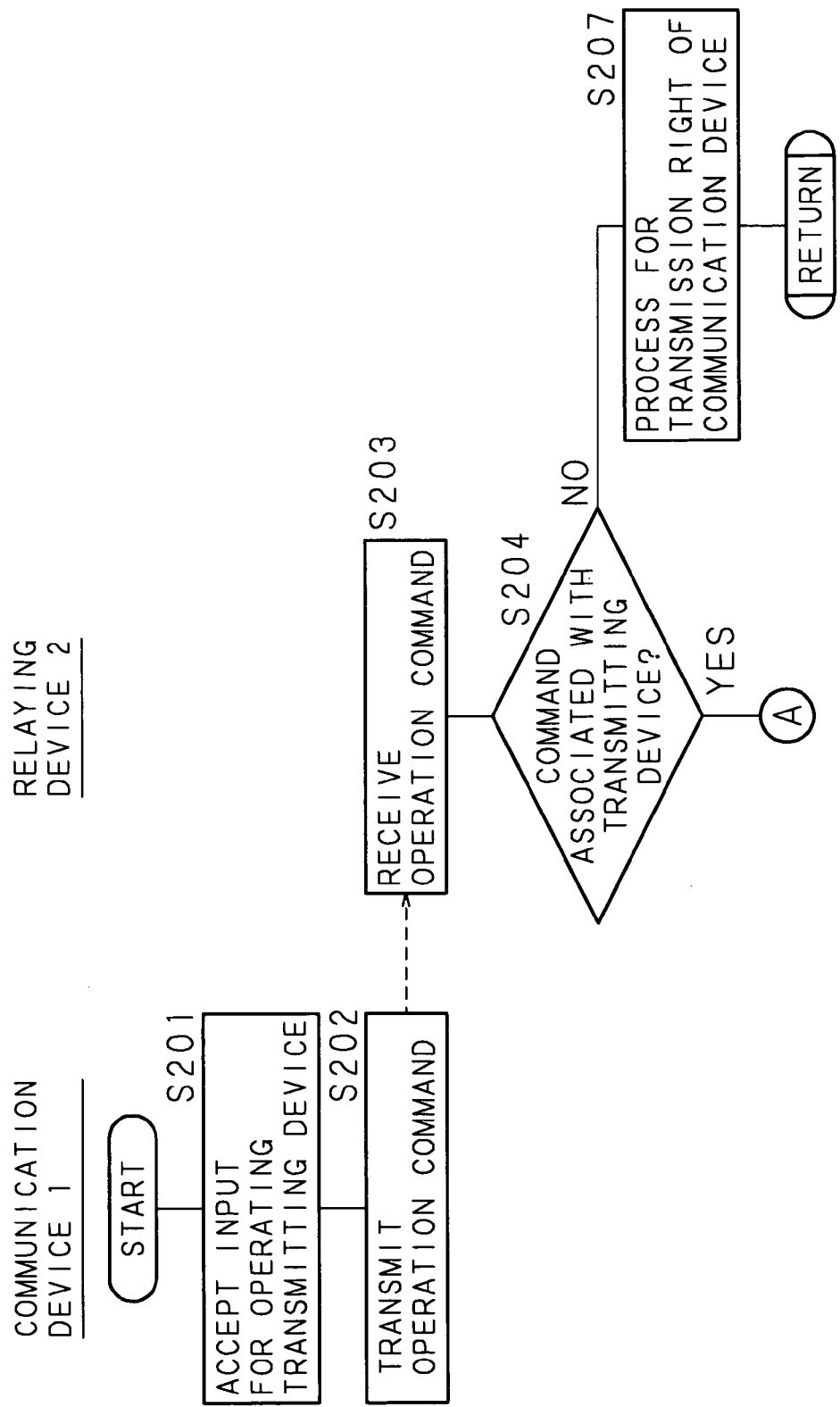
FIGS. 4A and 4B are flow charts illustrating a remote control process of the communication device, the relaying device and a transmitting device in the first embodiment of the present invention.
Figure 4B:
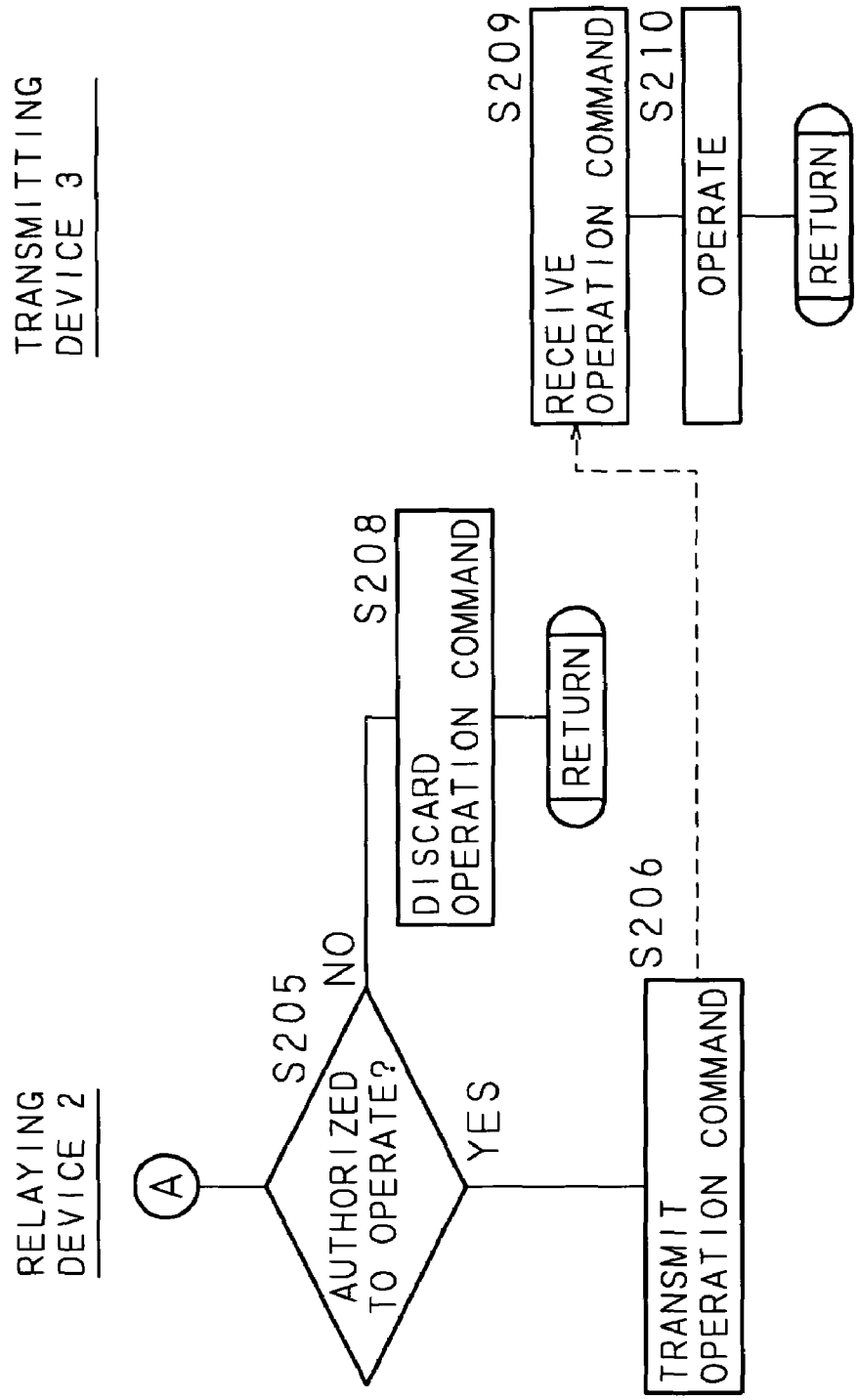

FIGS. 4A and 4B are flow charts illustrating a remote control process of the communication device 1, the relaying device 2 and the transmitting device 3 in the first embodiment of the present invention. The communication device 1, the relaying device 2, and the transmitting device 3 execute the following process by control of the respective control means 10, 20 and 30.

A user who operates the communication device 1, as a proxy of the transmitting device 3, that causes the transmitting device 3 to acquire a transmission right executes predetermined inputs for operating the transmitting device 3 if he/she desires to execute such operations as changing of the vertical direction of shooting angle by the transmitting device 3, changing of the horizontal direction of the shooting angle, changing of shooting scale factor, etc. The communication device 1 accepts the input for operating the transmitting device 3 from the control means 15 (S201), and, based on the accepted input, transmits an operation command for operating the transmitting device 3 from the communication means 16 through the communication network 100 to the relaying device 2 (S202). The operation command is one command contained in a group of commands associated with the transmitting device 3.

The relaying device 2 receives the operation command at the communication means 22 (S203), recognizes that the received operation command is a command, and determines whether it is a command associated with a transmission right of the communication device 1 of the transmission source or a command associated with the transmitting device 3 (S204).

If it is determined in step S204 that the received command is a command associated with the transmitting device 3 (S204: YES), the relaying device 2 determines whether or not the communication device 1 of the communication source of the command is a source of the transmission right request and is the communication device 1 authorized to operate the transmitting device 3 (S205). The determination in step S205 is made by collating the identification information indicating the device of the source of the packet received as the operation command with the identification information of the communication device 1 that is managed as the communication device 1 acting as a proxy for acquisition of the transmission right.

If it is determined in step S205 that it is the command transmitted from the communications 1 having the operation authority (S205:YES), the relaying device 2 follows the command and transmits the operation command from the communication means 22 through the communication network 100 to the transmitting device 3 (S206).

If it is determined in step S204 that it is not the command associated with the transmitting device 3, in other words, that it is the command such as a transmission right acquisition request, a transmission right release request, etc. of the communication device 1 of the transmission source (S204: NO), the relaying device 2 follows the command and executes the processes, such as granting, release, etc. of the transmission right to the communication device 1 (S207). In the embodiment, because the description is given to the embodiment of receiving the command associated with the transmitting device 3, unless there is any factor such as occurrence of abnormality, setting of other conditions, etc., it is determined in no case in step 204 that it is not the command associated with the transmitting device 3.

If it is determined in step S205 that the communication device 1 of the transmission source of the command is not the communication device 1 of the transmission source of the transmission right grant request having the operation authority (S205: NO), the relaying device 2 discards the received command (S208). In addition, in the embodiment, because the description is given to the embodiment of receiving the command from the communication device 1 having the operation authority, unless there is any factor such as occurrence of abnormality, setting of other conditions, etc., it is determined in no case in step 205 that it is not the command received from the communication device 1 having the operation authority.

The transmitting device 3 receives the operation command at the communication means 35 (S209), and, based on the received operation command, executes the operations of changing the vertical direction of the shooting angle, changing the horizontal direction of the shooting angle, changing the shooting scale factor, etc. (S210). Whether the operation has succeeded or not is transmitted as success information from the transmitting device 3 through the relaying device 2 to the communication device 1, and if the operation has failed, the operation command is transmitted again from the communication device 1. Thus, the remote control process is done.

Second Embodiment

A second embodiment is an embodiment of directly transmitting an operation command from a communication device to a transmitting device in the first embodiment. In the following description, components similar to those in the first embodiment shall be assigned same symbols as those in the first embodiment. As configuration examples of the communication system and respective devices provided for the communication system in the second embodiment of the present invention are similar to the first embodiment, reference shall be made to the first embodiment, and thus a description thereof shall be omitted.

Figure 5B:
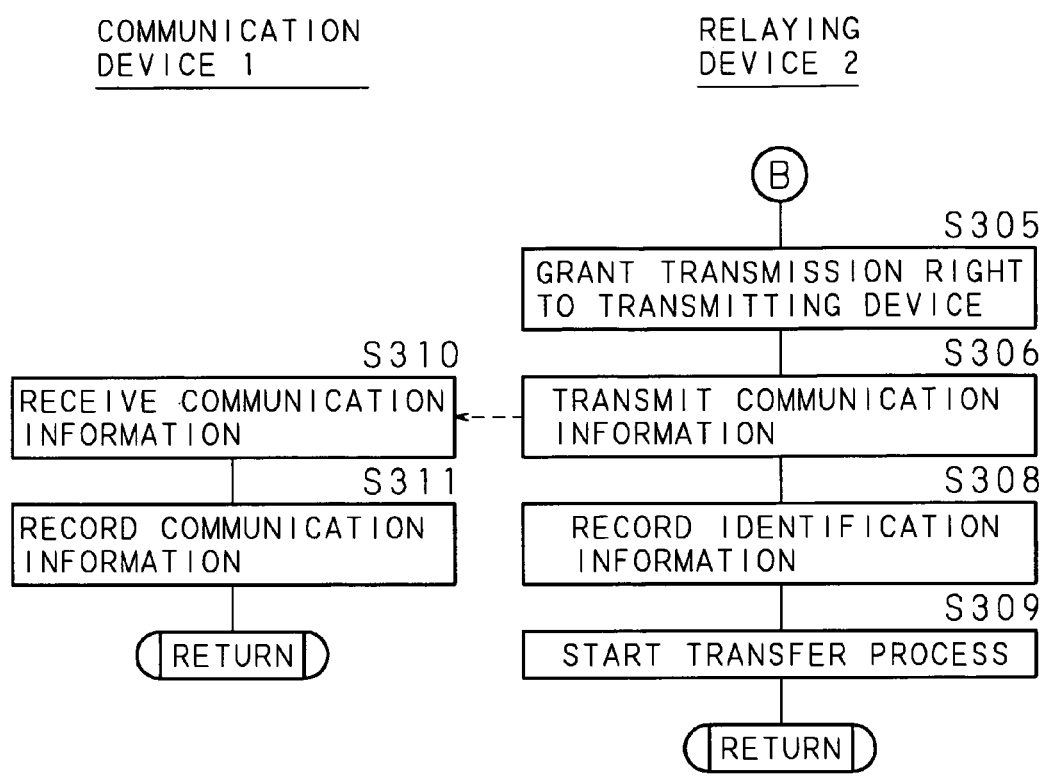

The following describes processes of the various devices the communication system in the second embodiment of the present invention includes. FIGS. 5A and 5B are flow charts illustrating a transmission right proxy acquisition process of the communication device 1 and the relaying device 2 in the second embodiment of the present invention. The communication device 1 and the relaying device 2 execute the following process by control of the respective control means 10 and 20.

If a user who operates the communication device 1 desires streaming delivery of shot images by the transmitting device 3, the predetermined operation so as to have the transmitting device 3 as a proxy of the transmitting device 3 acquire a transmission right is performed. The communication device 1 accepts a transmission right proxy acquisition operation from the operating means 15 (S301), and, based on the accepted operation, transmits from the communication means 16 through the communication network 100 to the relaying device 2, a transmission right grant request that is a command to request granting of a transmission right (S302).

The relaying device 2 receives the transmission right grant request at the communication means 22 (S303), recognizes that the received transmission right grant request is a command, and determines whether it is a command associated with a transmission right of the communication device 1 of the transmission source or a command associated with the transmitting device 3 (S304).

If it is determined in step S304 that it is a command associated with the transmitting device 3 (S304: YES), the relaying device 2 follows the received command and grants a transmission right to the transmitting device 3 (S305), and transmits to the communication device 1 communications information necessary for communication with the transmitting device 3 (S306). The communication information to be transmitted in step S306 is a communication address (IP address) indicating a location of the transmitting device 3 on the communication network 100 that mediates communication of the communication device 1, the relaying device 2 and the transmitting device 3.

If it is determined in step S304 that it is not a command associated with the transmitting device 3, in other words, that it is a command such as a transmission right acquisition request, a transmission right release request, etc. of the communication device 1 of the transmission source (S304: NO), the relaying device 2 follows the command and executes the processes associated with a transmission right such as granting, release, of the transmission right, etc. to the communication device 1 (S307). In addition, in the embodiment, because the description is given to the embodiment of receiving the command associated with the transmitting device 3, unless there is any factor such as occurrence of abnormality, setting of other conditions, etc., it is determined in no case in step 304 that it is not the command associated with the transmitting device 3.

The relaying device 2 that granted the transmission right and transmitted the communication information in steps S305 to S306 records in the recording means 21 the identification information that identifies the transmitting device 3 to which the transmission right was granted and the communication device 1 that will act as a proxy of the transmitting device 3, respectively (S308), receives image data being transmitted from the transmitting device 3 to which the transmission right was granted, and starts a transfer process for broadcasting the received image data to a plurality of other devices (S309).

The communication device 1 receives the communication information of the transmitting device 3 at the communication means 16 (S310) and records the received communication information in the recording means 11 (S311). Thus, the transmission right proxy acquisition process is executed.

Figure 6:
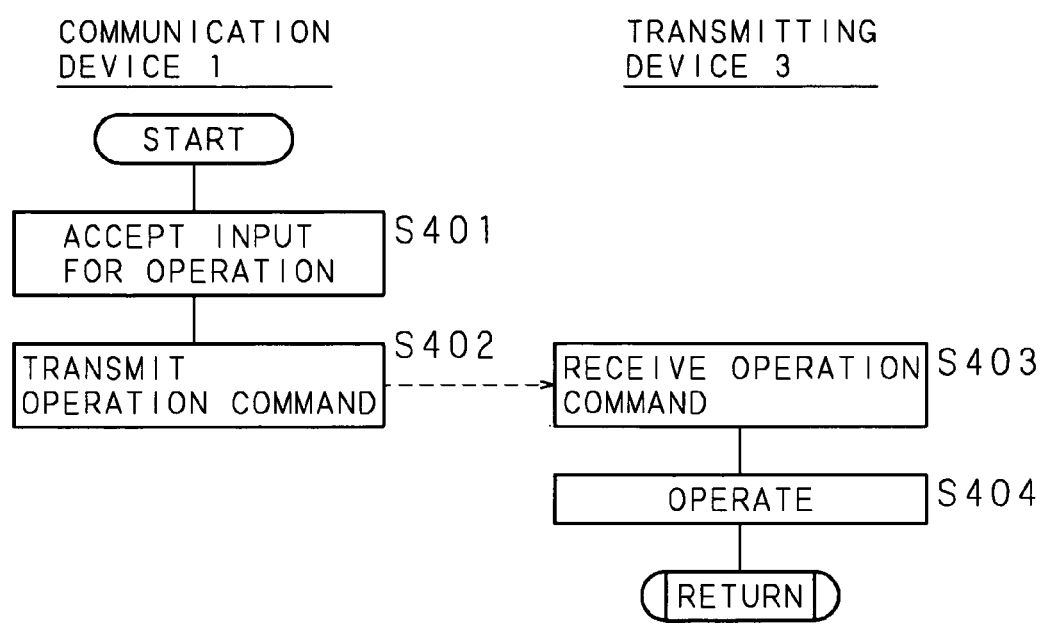
FIG. 6 is a flow chart illustrating a remote control process of the communication device and a transmitting device in the second embodiment of the present invention.

FIG. 6 is a flow chart illustrating the remote control process of the communication device 1 and the transmitting device 3 in the second embodiment of the present invention. The communication device 1 and the transmitting device 3 execute the following process by control of the respective control means 10 and 30.

If a user who operates the communication device 1 that, as a proxy of the transmitting device 3, causes the transmitting device 3 to acquire a transmission right desires the operations of changing the vertical direction of the shooting angle, changing the horizontal direction of the shooting angle, changing the shooting scale factor, etc. by the transmitting device 3, it executes predetermined input for operating the transmitting device 3. The communication device 1 accepts the input for operating the transmitting device 3 from the operating means 15 (S401) and, based on the accepted input, transmits the operation command for operating the transmitting device 3 from the communication means 16 through the communication network 100 to the transmitting device 3 indicated in the communication information recorded in the recording means 11 (S402). In step S402, the transmission is based on the communication information the transmitting device 3, and therefore the operation command is transmitted to the transmitting device 3 without going through the relaying device 2.

The transmitting device 3 receives the operation command at the communication means 35 (S403), and, based on the received operation command, executes the operations of changing the vertical direction of the shooting angle, changing the horizontal direction of the shooting angle, changing the shooting scale factor, etc. (S404). Whether the operation has succeeded or not is transmitted as success information from the transmitting device 3 to the communication device 1, and if the operation has failed, the operation command is transmitted again from the communication device 1. Thus, the remote control process is done.

Third Embodiment

A third embodiment is an embodiment wherein in the first embodiment, the communication device causes the transmitting device to transmit a command associated with a transmission right, and after the transmitting device acquires the transmission right, the communication device directly transmits an operation command to the transmitting device. In the following description, components similar to those in the first embodiment shall be assigned same symbols as those in the first embodiment. As configuration examples of the communication system and respective devices provided for the communication system in the third embodiment of the present invention are similar to the first embodiment, reference shall be made to the first embodiment, and thus a description thereof shall be omitted.

Figure 7A:
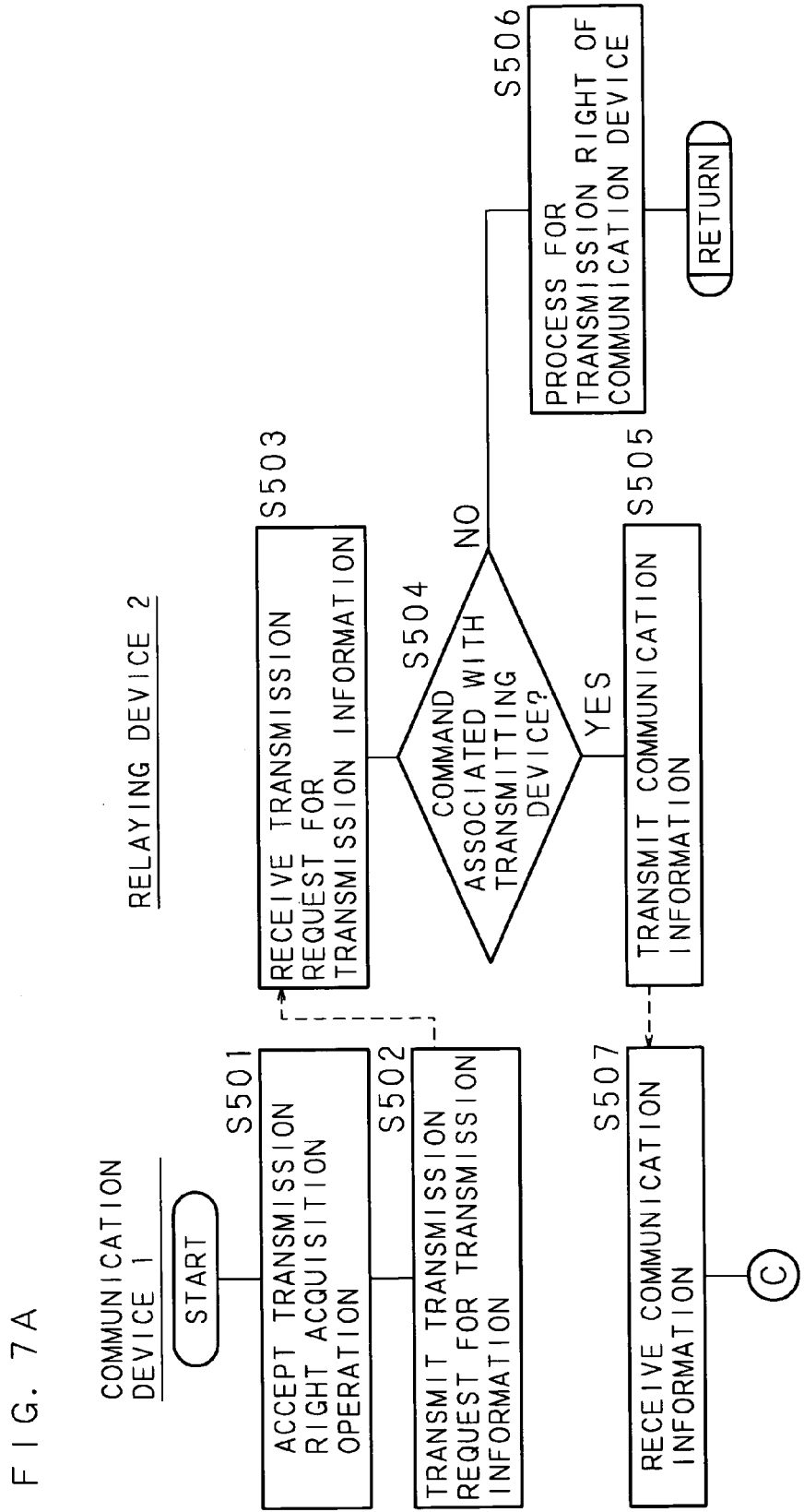

The following describes processes of the various devices the communication system in the third embodiment of the present invention includes. FIGS. 7A and 7B are flow charts illustrating a transmission right acquisition process of the communication device 1, the relaying device 2, and the transmitting device 3 in the third embodiment of the present invention. The communication device 1, the relaying device 2, and the transmitting device 3 execute the following process by control of the respective control means 10, 20 and 30.

If a user who operates the communication device 1 desires streaming delivery of shot images by the transmitting device 3, it executes predetermined operation to cause the transmitting device 3 to acquire a transmission right. The communication device 1 accepts a transmission right acquisition operation from the operating means 15 (S501), and, based on the accepted operation, transmits from the communication means 16 through the communication network 100 to the relaying device 2 a transmission request for transmission information that is a command to request transmission of communication information such as a communication address necessary for communication of the transmitting device 3 (S502).

The relaying device 2 receives the transmission request for transmission information at the communication means 22 (S503), recognizes that the received transmission request for transmission information is a command, and determines whether it is a command associated with the transmission right of the communication device 1 of the transmission source or a command associated with the transmitting device 3 (S504).

If it is determined in step S504 that it is the command associated with the transmitting device 3 (S504: YES), the relaying device 2 follows the command and transmits to the communication device 1 the communication information necessary for communication with the transmitting device 3 recorded in the recording means 21 (S505).

If it is determined in step S504 that it is not the command associated with the transmitting device 3, in other words, that it is the command such as a transmission right acquisition request, a transmission right release request, etc. of the communication device 1 of the transmission source (S504: NO), the relaying device 2 follows the command, and executes the processes associated with the transmission right, such as granting, release, etc. of the transmission right to the communication device 1 (S506). In addition, in the embodiment, because the description is given to the embodiment of receiving the command associated with the transmitting device 3, unless there is any factor such as occurrence of abnormality, setting of other conditions, etc., it is determined in no case in step 504 that it is not the command associated with the transmitting device 3.

The communication device 1 receives the communication information of the transmitting device 3 at the communication means 16 (S507), record the received communication information in the recording means 11 (S508), and transmits an instruction to transmit a transmission right request that is a command to cause the transmitting device 3 to transmit a transmission right request for requesting a transmission right to the transmitting device 3, from the communications means 16 through the communication network 100 to the transmitting device 3 indicated by the recorded communication information (S509). As step S509 is the transmission based on the communication information of the transmitting device 3, the instruction to transmit the transmission right request is sent to the transmitting device 3 without going through the relaying device 2.

The transmitting device 3 receives the instruction to transmit the transmission right request at the communication means 35 (S510), reads the communication information relating to the communication device 1 of the transmission source of the instruction to transmit the transmission right request from the header information of a packet containing the instruction to transmit the transmission right request, records the read communication information of the communication device 1 in the recording means 31 (S511), and, based on the instruction to transmit the transmission right request, transmits to the relaying device 2 through the communication network 100 the transmission right request that is a command to request the transmission right to itself (S512). The communication information relating to the communication device 1 is information such as a communication address (IP address) indicating a location of the communication device 1 on the communication network 100, etc. In step S512, the transmitting device 3 records the communication information of the communication device 1 as communication information of a device that has operation authority.

The relaying device 2 receives the transmission right request at the communication means 22 (S513), and recognizes that the received transmission right request is a command. Then, after determining that it is a command associated with the transmission right of the device of the transmission source, the transmitting device 3 herein, the relaying device follows the received command and grants the transmission right to the transmitting device 3 (S514).

Then, the relaying device 2 records identification information specifying the transmitting device 3 to which the transmission right was granted in the recording means 21 (S515), receives image data being transmitted from the transmitted device 3 to which the transmission right was granted, and starts a transfer process for broadcasting the received image data to a plurality of other devices (S516). Thus, the transmission right acquisition process is carried out.

FIG. 8 is a flow chart illustrating a remote control process of the communication device 1 and the transmitting device 3 in the third embodiment of the present invention. The communication device 1 and the transmitting device 3 execute the following process by control of the respective control means 10 and 30.

If a user who operates the communication device 1 that causes the transmitting device 3 to acquire a transmission right desires the operations of changing the vertical direction of shooting angle, changing the horizontal direction of the shooting angle, changing the shooting scale factor, etc. by the transmitting device 3, he/she executes predetermined inputs for operating the transmitting device 3. The communication device 1 accepts the input for operating the transmitting device 3 from the operating means 15 (S601), and, based on the accepted input, transmits an operation command for operating the transmitting device 3 from the communication means 16 through the communication network 100 to the transmitting device 3 indicated in the communication information recorded in the recording means 11 (S602).

The transmitting device 3 receives the operation command at the communications means 35 (S603), and determines whether or not the communication device 1 of the transmission source of the received operation command is the communication device 1 that is the transmission source of the instruction to transmit the transmission right request and has the operation authority (S604). The determination in step S604 is made by reading the communication information relating to the communication device 1 of the transmission source from the header information of the packet containing the received operation command, and collating the read communication information with the communication information recorded as the communication information of the communication device 1 that has the operation authority, in the recording means 31.

If it is determined in step S604 that it is the communication device 1 that has the operation authority (S604: YES), the transmitting device 3 executes the operations of changing the vertical direction of the shooting angle, changing the horizontal direction of the shooting angle, changing the shooting scale factor, etc., based on the received operation command (S605). Whether the operation has succeeded or not is transmitted as success information from the transmitting device 3 to the communication device 1, and if the operation has failed, the operation command is transmitted again from the communication device 1.

If it is determined in step S604 that it is not the communication device 1 that has the operation authority (S604: NO), the transmitting device 3 discards the received operation command (S606). In addition, in the embodiment, because the description is given to the embodiment of receiving the command from the communication device 1 that has the operation authority, unless there is any factor such as occurrence of abnormality, setting of other conditions, etc., it is determined in no case in step 604 that it is not the command received from any device other than the communication device 1 that has the operation authority. Thus, the remote control process is done.

Although the first to third embodiments illustrate the embodiments wherein a terminal for an IP telephone provided with the transceiver function is used as a communication device, the present invention is not limited to this, and can be developed into various embodiments in which it may be any computer if it can be connected to a communication network, or a computer such as a personal computer may implement a part of all of grouped communication devices, etc.

In addition, although the first to third embodiments illustrate the embodiment wherein the transmitting device transmits the image data, the present invention is not limited to this, and enables transmission of different data such as voice data, detection data generated by using a sensor that detects conditions of various devices, meteorological data generated by using a sensor that detects weather conditions such as temperature, humidity, wind direction.

In addition, although the embodiments illustrate the embodiment wherein there is one transmitting device, the present invention is not limited to this and can use a plurality of transmitting devices, in which case it is also possible to configure a communication device having operation authority for each transmitting device.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A communication method, wherein using a plurality of communication devices and a relaying device that relays data transfer among the communication devices, one communication device transmits to the relaying device a transmission right request for requesting a transmission right, which is one of commands associated with its own transmission right and transmits data to the relaying device when the communication device is granted a transmission right by the relaying device, and the relaying device broadcasts the received data to other communication device, the communication method comprising the steps of:

the communication device transmitting to the relaying device a transmission right grant request for requesting a grant of a transmission right to a transmitting device, which is one of commands associated with the transmitting device that communicates with the relaying device and transmits data to the relaying device;

the relaying device determining whether the received transmission right grant request is a command associated with a transmission right of the communication device of a transmission source or a command associated with the transmitting device;

if relaying device determines that it is the command associated with the transmitting device, the relaying device following the command and granting the transmission right to the transmitting device;

the relaying device broadcasting to the plurality of communication devices data being transmitted from the transmitting device to which the transmission right was granted;

the communication device further transmitting to the relaying device an operation command for operating the transmitting device that is one of the commands associated with the transmitting device;

the relaying device further determining whether the received operation command is the command associated with the transmission right of the communication device of the transmission source or the command associated with the transmitting device;

if the relaying device determines that it is the command associated with the transmitting device, the relaying device transmitting the operation command to the transmitting device; and the transmitting device operating based on the received operation command.

2. A communication method, wherein using a plurality of communication devices and a relaying device that relays data transfer among the communication devices, one communication device transmits to the relaying device a transmission right request for requesting a transmission right, which is one of commands associated with its own transmission right and transmits data to the relaying device when the communication device is granted a transmission right by the relaying device, and the relaying device broadcasts the received data to other communication device, the communication method comprising the steps of:

the communication device transmitting to the relaying device a transmission right grant request that is one of commands associated with a transmitting device that communicates with the relaying device and the communication devices, and transmits data to the relaying device;

the relaying device determining whether the received transmission right grant request is a command associated with a transmission right of the communication device of a transmission source or a command associated with the transmitting device;

if relaying device determines that it is the command associated with the transmitting device, the relaying device following the command and granting the transmission right to the transmitting device;

the relaying device broadcasting to the plurality of communication devices data being transmitted from the transmitting device to which the transmission right was granted;

the relaying device transmitting to the communication device communication information necessary for communication with the transmitting device;

based on the received communication information, the communication device further transmitting an operation command for operating the transmitting device to the transmitting device; and the transmitting device operating based on the received operation command.

3. A communication method, wherein using a plurality of communication devices and a relaying device that relays data transfer among the communication devices, one communication device transmits to the relaying device a transmission right request for requesting a transmission right and transmits data to the relaying device when the communication device is granted a transmission right by the relaying device, and the relaying device broadcasts the received data to other communication device, the communication method comprising the steps of:

the communications device transmitting to the relaying device a communication information transmission request for requesting transmission of communication information necessary for communication with a transmitting device that communicates with the relaying device and the communication devices, and transmits data to the relaying device;

the relaying device transmitting the communication information to the communication device in response to the received communication information transmission request;

based on the received communication information, the communication device further transmitting to the transmitting device an instruction to transmit a transmission right request that causes causing the transmitting device to transmit a transmission right request for requesting a transmission right to the transmitting device;

based on the received instruction to transmit the transmission right request, the transmitting device transmitting to the relaying device a transmission right request for requesting the transmission right to itself;

based on the received transmission right request, the relaying device further granting the transmission right to the transmitting device;

the relaying device broadcasting to the plurality of communication devices data being transmitted from the transmitting device to which the transmission right was granted;

based on the communication information, the communication device further transmitting to the transmitting device an operation command for operating the transmitting device, and the transmitting device further operating based on the received operation command.

4. A communication system, comprising:

a plurality of communication devices;

a relaying device for relaying data transfer among the communication devices; and a transmitting device for communicating with the relaying device and transmitting data to the relaying device, wherein one communication device comprises:

a communication unit, and a controller coupled with the communication unit, and capable of performing an operation of:

causing the communication unit to transmit to the relaying device a transmission right grant request for requesting a grant of a transmission right to the transmitting device, which is one of the commands associated with the transmitting device, the relaying device comprises a communications unit; and a controller coupled with the communication unit, and capable of performing operations of:

determining whether the received transmission right grant request is a command associated with a transmission right of the communication device of a transmission source or a command associated with the transmitting device;

if the controller determines that it is the command associated with the transmitting device, following the command and granting a transmission right to the transmitting device; and causing the communication unit to broadcast to the plurality of communication devices data being transmitted from the transmitting device to which the transmission right is granted, the controller of the communication device is further capable of performing an operation of causing the communication unit to transmit to the relaying device an operation command for operating the transmitting device, which is one of the commands associated with the transmitting device, the controller of the relaying device is further capable of performing an operation of:

determining whether the received operation command is the command associated with a transmission right of the communication device of the transmission source or the command associated with the transmitting device; and if the controller determines that it is the command associated with the transmitting device, causing the communication unit to transfer the operation command to the transmitting device, the transmitting device operating based on the received operation command.

5. The communication system according to claim 4, wherein the controller of the relaying device is further capable of performing operations of:
- determining whether or not the communication device of the transmission source of a command associated with the transmitting device is the communication device of the transmission source of a transmission right grant request; and
- if the controller determines that the communication device of the transmission source of the command associated with the transmitting device is not the communication device of the transmission source of the transmission right grant request, discarding the received command.

6. The communication system according to claim 4, wherein the transmitting device comprises:
- a shooting unit, and
- is configured to transmit, as data, images based on shooting by the shooting unit.

7. The communication system comprising:
- a plurality of communication devices;
- a relaying device for relaying data transfer among the communication devices; and
- a transmitting device that communicate with the relaying device and communication devices and transmits data to the relaying device, wherein
- one communication device comprises
- a communication unit; and
- a controller coupled with the communication unit, and capable of performing an operation of:
  - causing the communication unit to transfer to the relaying device a transmission right grant request for requesting a grant of a transmission right to the transmitting device, which is one of the commands associated with the transmitting device,
- the relaying device comprises:
- a communication unit; and
- a controller coupled with the communication unit, and capable of performing operations of:
  - determining whether the received transmission right grant request is a command associated with a transmission right of the communication device of a transmission source or a command associated with the transmitting device;
  - if the controller determines that it is the command associated with the transmitting device, following the command and granting the transmission right to the transmitting device;
  - causing the communication unit to transmit to the communication device communication information necessary for communication with the transmitting device; and
  - causing the communication unit to broadcast to the plurality of communication devices data to being transmitted from the transmitting device to which the transmission right was granted,
- the controller of the communication device is further capable of performing an operation of:
  - causing the communication unit to transmit to the transmitting device an operation command for operating the transmitting device based on the received communication information, and
- the transmitting device operating based on the received operation command.

8. The communication system, according to claim 7, wherein the transmitting device comprises:
- a controller capable of performing operations of:
  - determining whether or not the communication device of the transmission source of the operation command is the communication device of the transmission source of an instruction to transmit a transmission right request; and
  - if the controller determines that the communication device of the transmission source of the operation command is not the communication device of the transmission source of the instruction to transmit a transmission right request, discarding the received operation command.

9. The communication system according to claim 7, wherein the transmitting device further comprises:
- a shooting unit, and
- is configured to transmit, as data, images based on shooting of the shooting unit.

10. A communication system comprising:
- a plurality of communication devices;
- a relaying device for relaying data transfer among the communication devices; and
- a transmitting device that communicates with the relaying device and communication devices, and transmits data to the relaying device, wherein
- one communication device comprise
- a communication unit: and
- a controller coupled with the communication unit, and capable of performing an operation of
  - causing the communication unit to transmit to the relaying device a communication information transmission request for requesting transmission of the communication information necessary for communication with the transmitting device,
- the relaying device comprises
- a communication unit; and
- a controller coupled with the communication unit and capable of performing an operation of
  - causing the communication unit to transmit to the transmitting device the communication information, in response to the received communication information transmission request,
- the controller of the communication device is further capable of performing an operation of
  - based on the received communication information, causing the communication unit to transmit to the transmitting device an instruction to transmit a transmission right request that causes the transmitting device to transmit a transmission right request for requesting a transmission right to the transmitting device,
- the transmitting device comprises
- a communication unit; and
- a controller coupled with the communication unit, and capable of performing an operation of
  - causing the communication unit to transmit to the relaying device the transmission right request for requesting a transmission right to itself, based on the received instruction to transmit the transmission right request,
- the controller of the relaying device is further capable of performing operations of:
  - granting the transmission right to the transmitting device, based on the received transmission right request; and
  - causing the communication unit to broadcast to the plurality of communication devices data being transmitted from the transmitting device to which the transmission right was granted, the controller of the communication device is further capable of performing an operation of
based on the communication information, causing the communication unit to transmit to the transmitting device an operation command for operating the transmitting device, and
the transmitting device operating based on the received operation command.

11. The communication system according to claim 10, wherein the controller of the transmitting device is further capable of performing operations of:
determining whether or not the communication device of a transmission source of the operation command is the communication device of the transmission source of an instruction to transmit transmission right request, and
if the controller determines that the communication device of the transmission source of the operation command is not the communication device of the transmission source of an instruction to transmit a transmission right request, discarding the received operation command.

12. The communication system according to claim 10, wherein the transmitting device further comprises:
a shooting unit, and
is configured to transmit, as data, images based on shooting of the shooting unit.

13. A relaying device comprising:
a communication unit communicating with a plurality of communication devices and a transmitting device that transmits data;
a controller coupled with the communication unit, and capable of performing operations of:
causing the communication unit to receive from one communication device a transmission right grant request for requesting a grant of a transmission right to the transmitting device, which is one of commands associated with the transmitting device;
determining whether the received command is a command associated with a transmission right of the communication device of a transmission source or a command associated with the transmitting device;
if the controller determines that it is the command associated with the transmitting device, following the command and granting the transmission right to the transmitting device;
causing the communication unit to broadcast to the plurality of communication devices data being transmitted from the transmitting device to which the transmission right is granted;
causing the communication unit to receive from the communication device an operation command for operating the transmitting devices, which is one of commands associated with the transmitting device;
determining whether the received command is the command associated with the transmission right of the communication device of the transmission source or the command associated with the transmitting device; and if the controller determines that it is the command associated with the transmitting device, causing the communication unit to transmit the operation command to the transmitting device.

14. A relaying device comprising:
a communication unit communicating with a plurality of communication device and a transmitting device that transmits data; and
a controller coupled with the communication unit, and capable of performing operations of:
causing the communication unit to receive from one communication device a transmission right grant request for requesting a grant of a transmission right to the transmitting device, which is one of the commands associated with the transmitting device;
determining whether the received command is a command associated with a transmission right of a communication device of a transmission source, or a command associated with the transmitting device;
if the controller determines that it is the command associated with the transmitting device, following the command and granting the transmission right to the transmitting device;
causing the communication unit to broadcast to the plurality of communication devices data being transmitted from the transmitting device to which the transmission right is granted; and
causing the communication unit to transmit to the communication device communication information necessary for communicating with the transmitting device.

15. A communication device communicating with a relaying device which communicates with a plurality of devices, grants a transmission right to one device of a transmission source of a transmission right request when the relaying device receives the transmission right request for requesting the transmission right from the one device, and broadcasts data received from the one device to which the transmission right is granted, the communication device comprising:
a communication unit for communicating with a plurality of communication devices and a transmitting device that transmits data;
a controller coupled with the communication unit, and capable of performing operations of:
causing the communication unit to transmit to the relaying device a transmission right grant request for requesting the grant of the transmission right to the transmitting device that communicates with the relaying device and transmits data to the relaying device; and
causing the communication unit to transmit to the relaying device an operation command for operating the transmitting device.

* * * * *